Sept. 12, 1933.  E. J. FOURNIER  1,926,332
ROTARY DRUM MILLING MACHINE
Filed Oct. 22, 1928  12 Sheets-Sheet 1
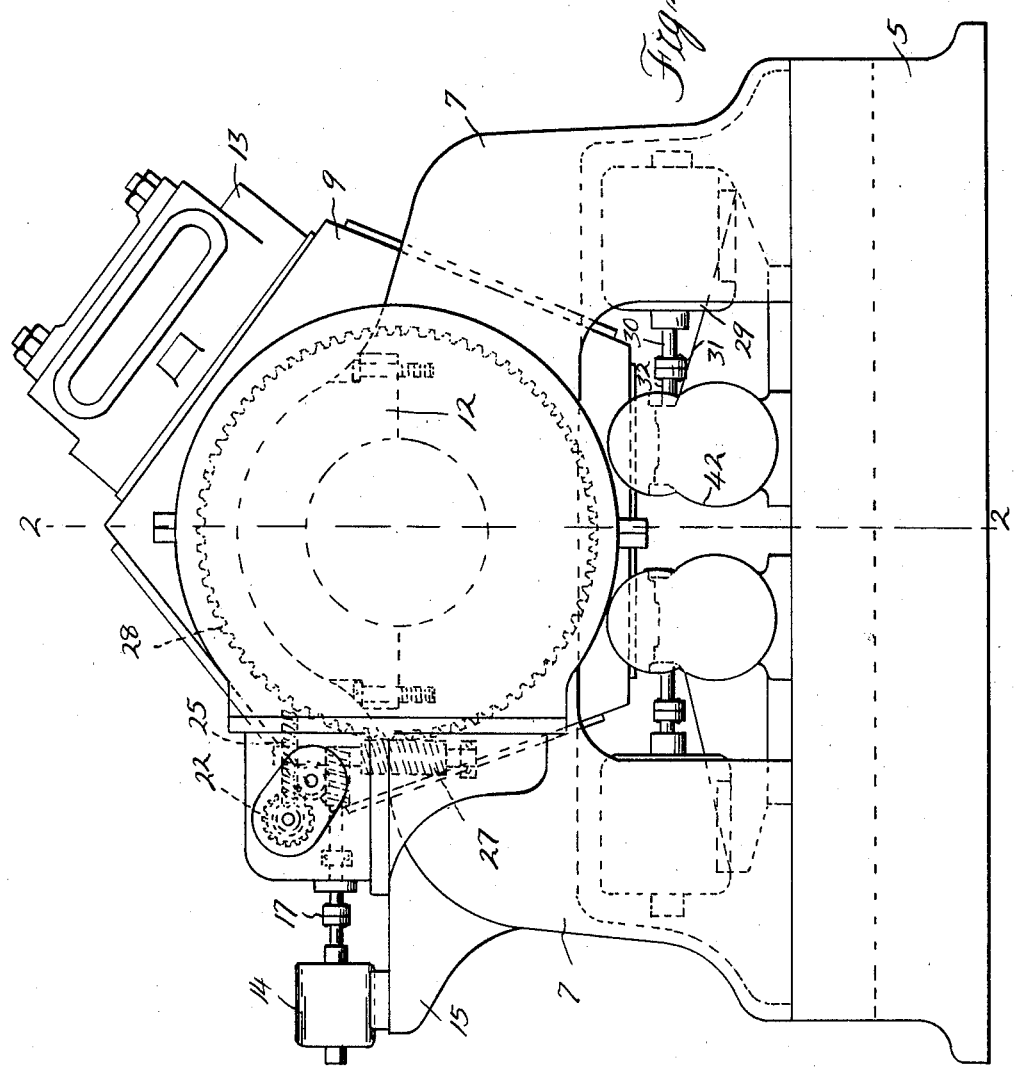
Inventor
Emmanuel J. Fournier
By Swan, Frye & Murray
Attorneys

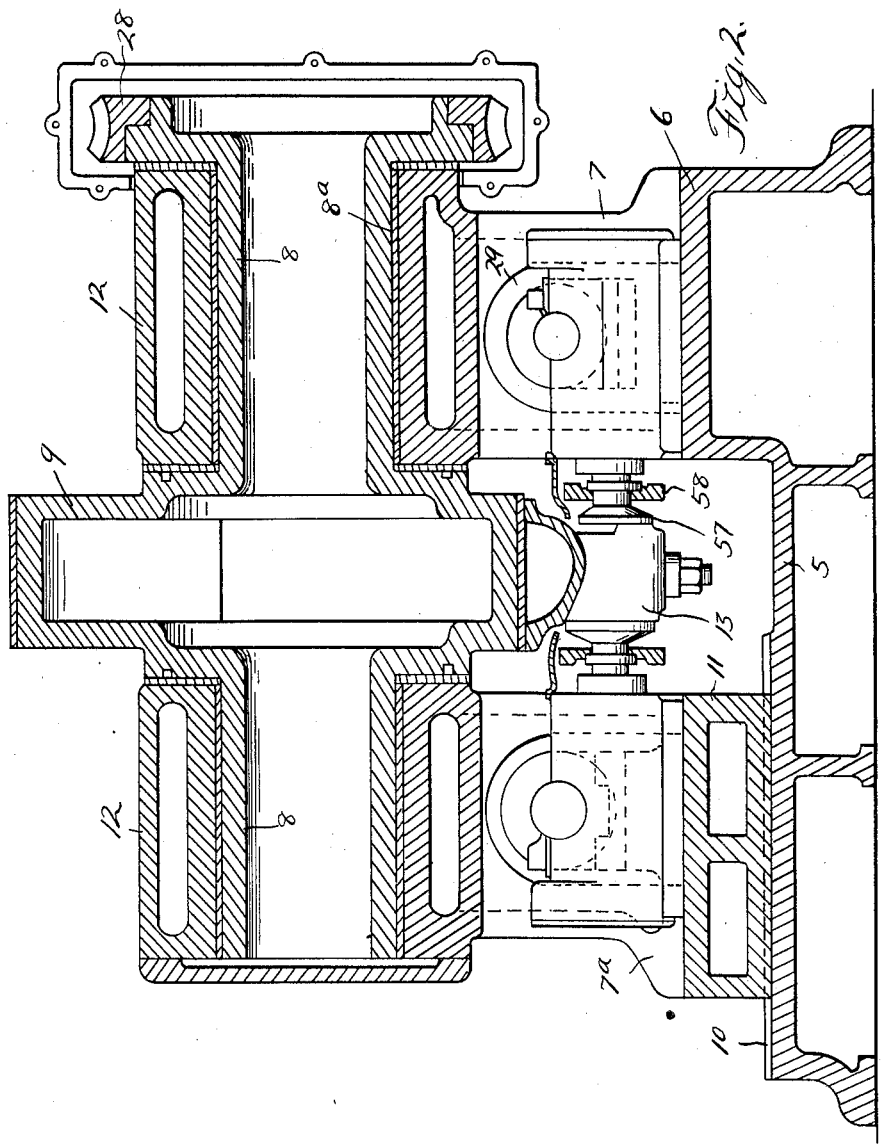

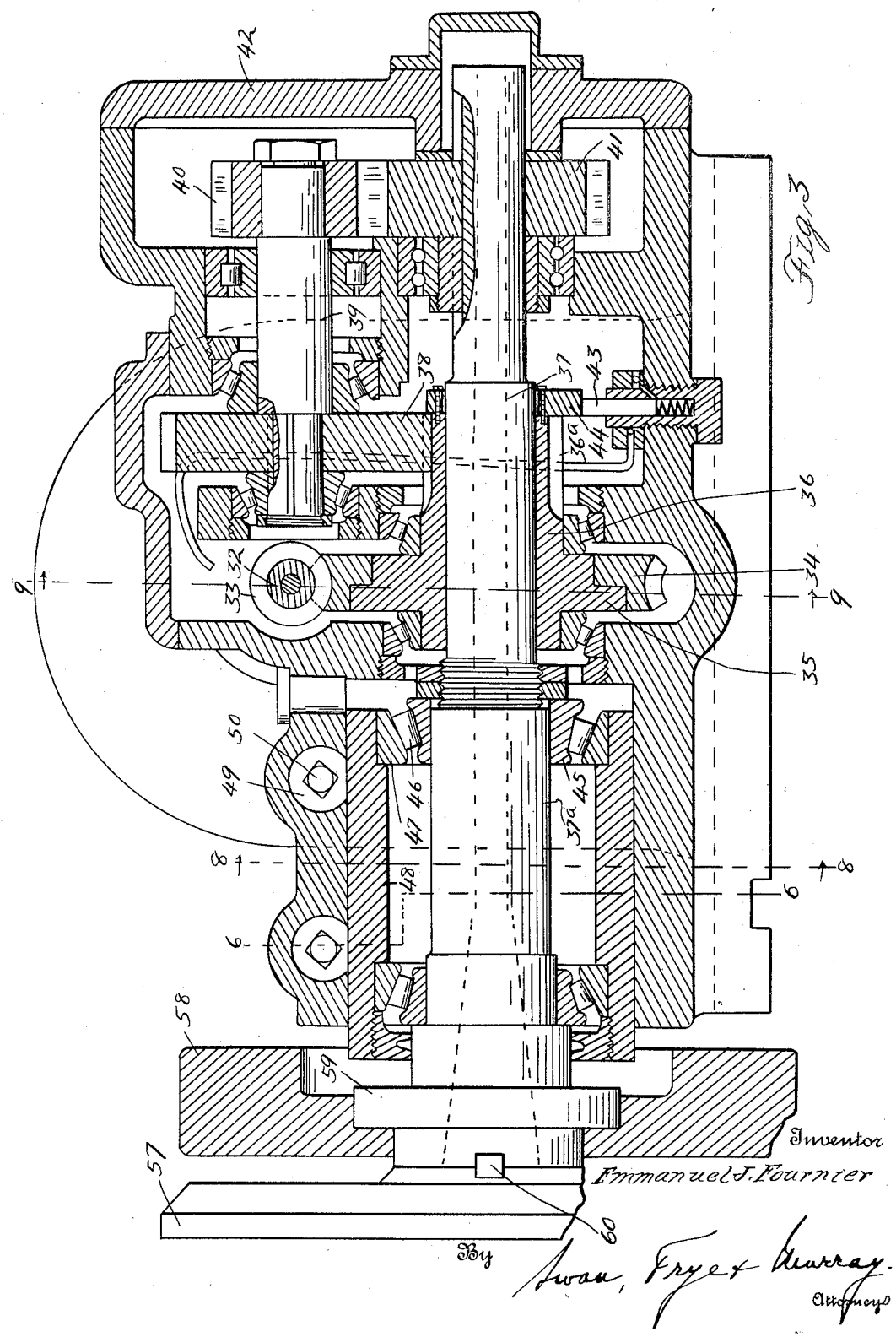

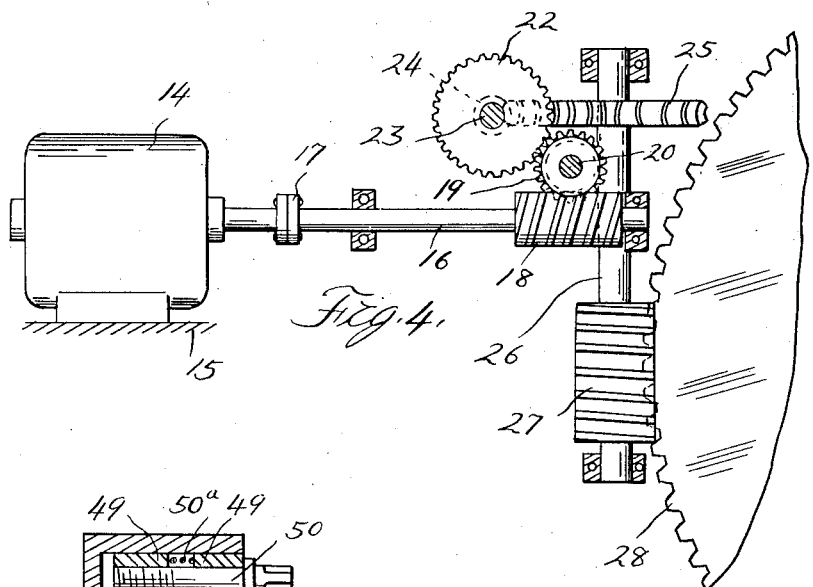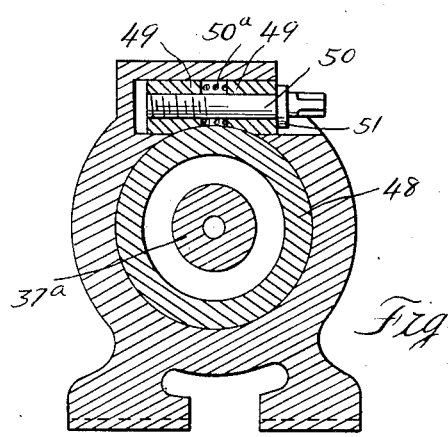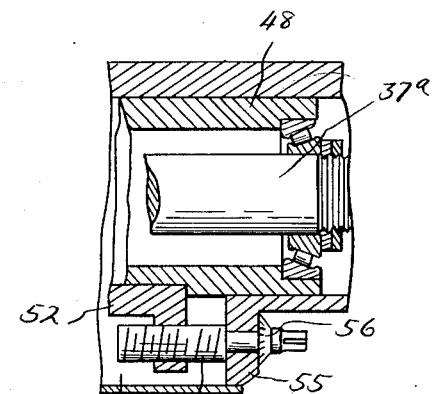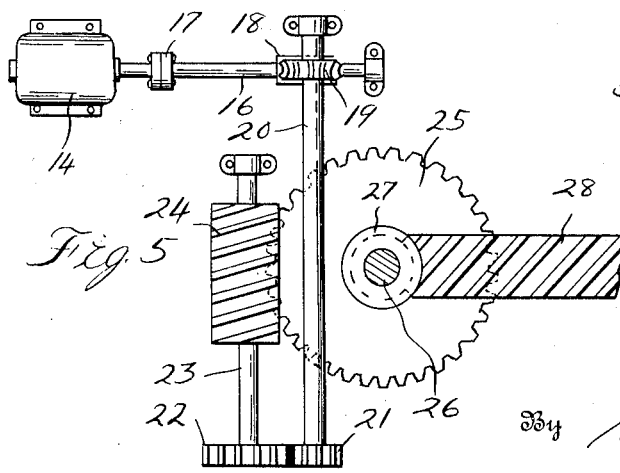

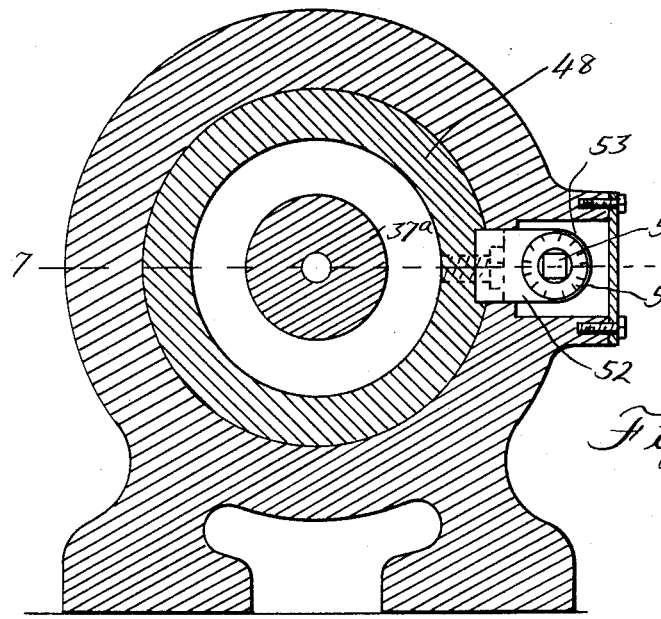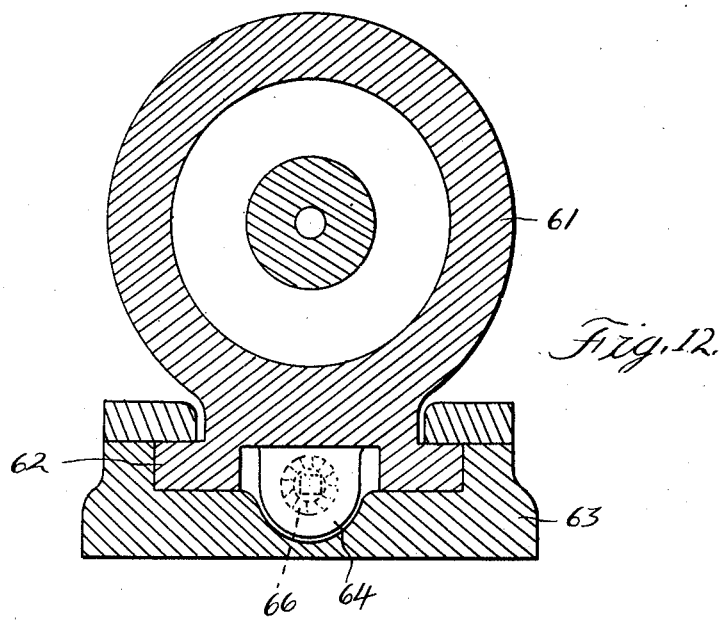

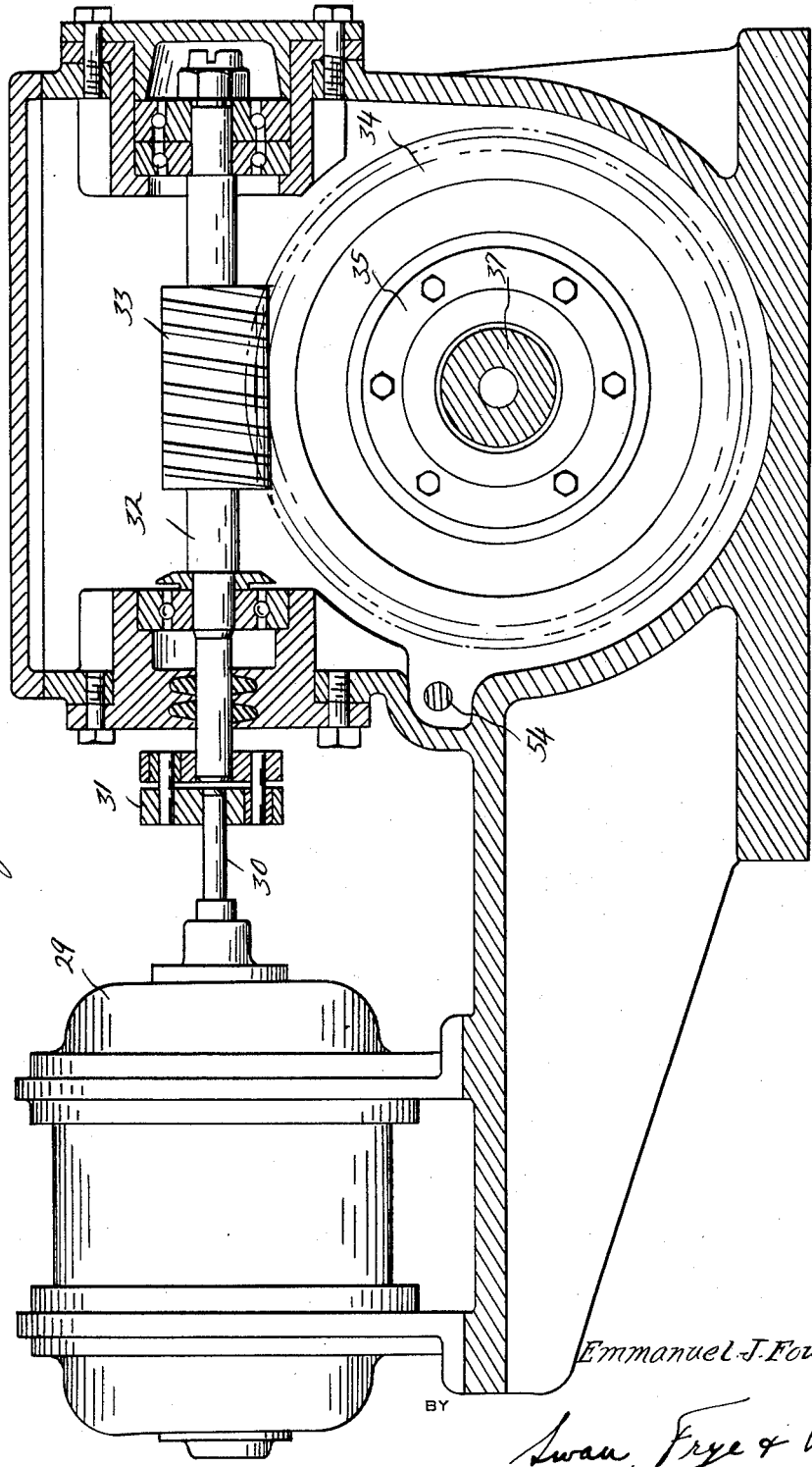

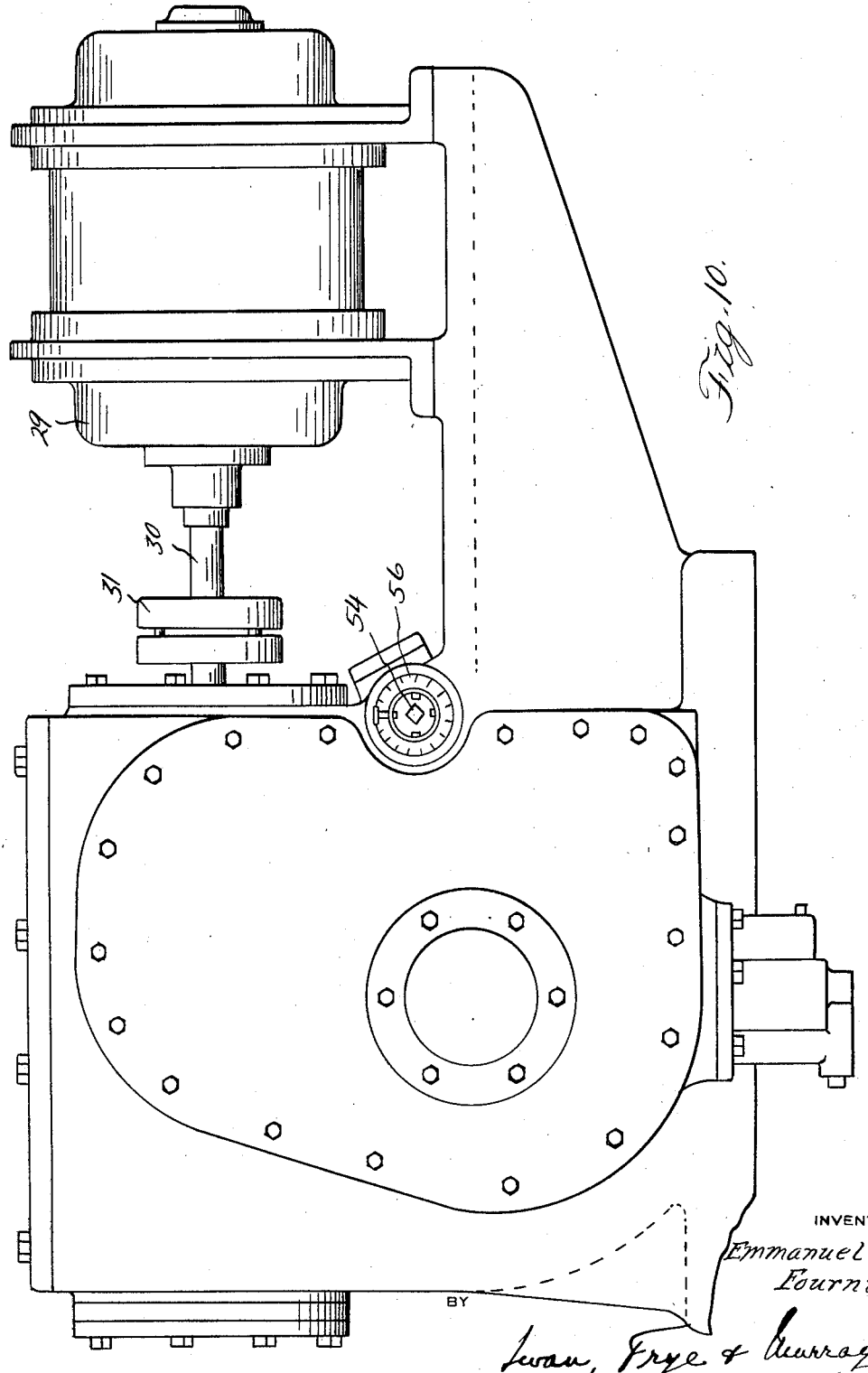

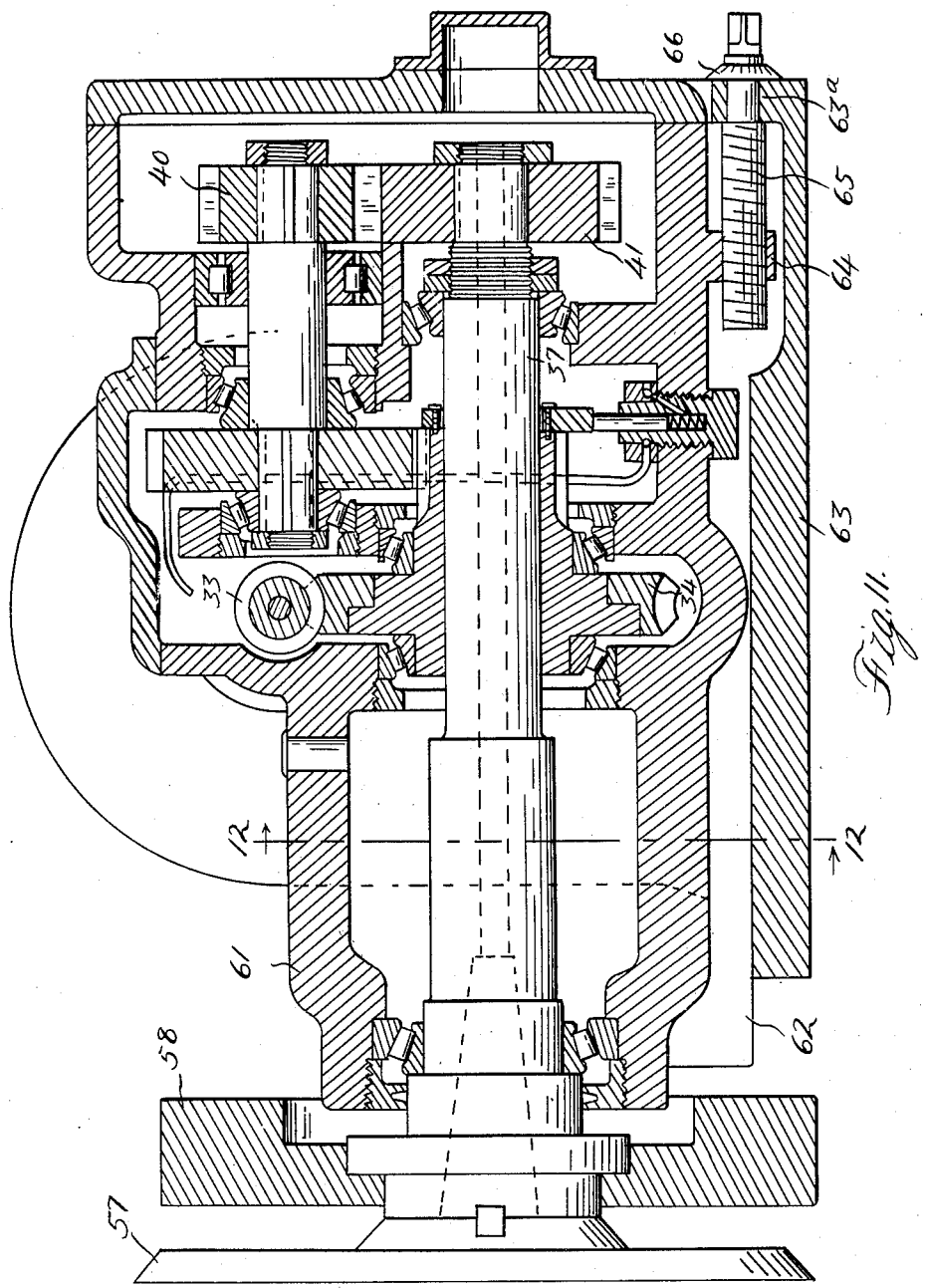

Sept. 12, 1933. E. J. FOURNIER 1,926,332
ROTARY DRUM MILLING MACHINE
Filed Oct. 22, 1928 12 Sheets-Sheet 9

Inventor
Emmanuel J. Fournier

By Swan, Frye & Murray.
Attorneys

Sept. 12, 1933.  E. J. FOURNIER  1,926,332
ROTARY DRUM MILLING MACHINE
Filed Oct. 22, 1928   12 Sheets-Sheet 10
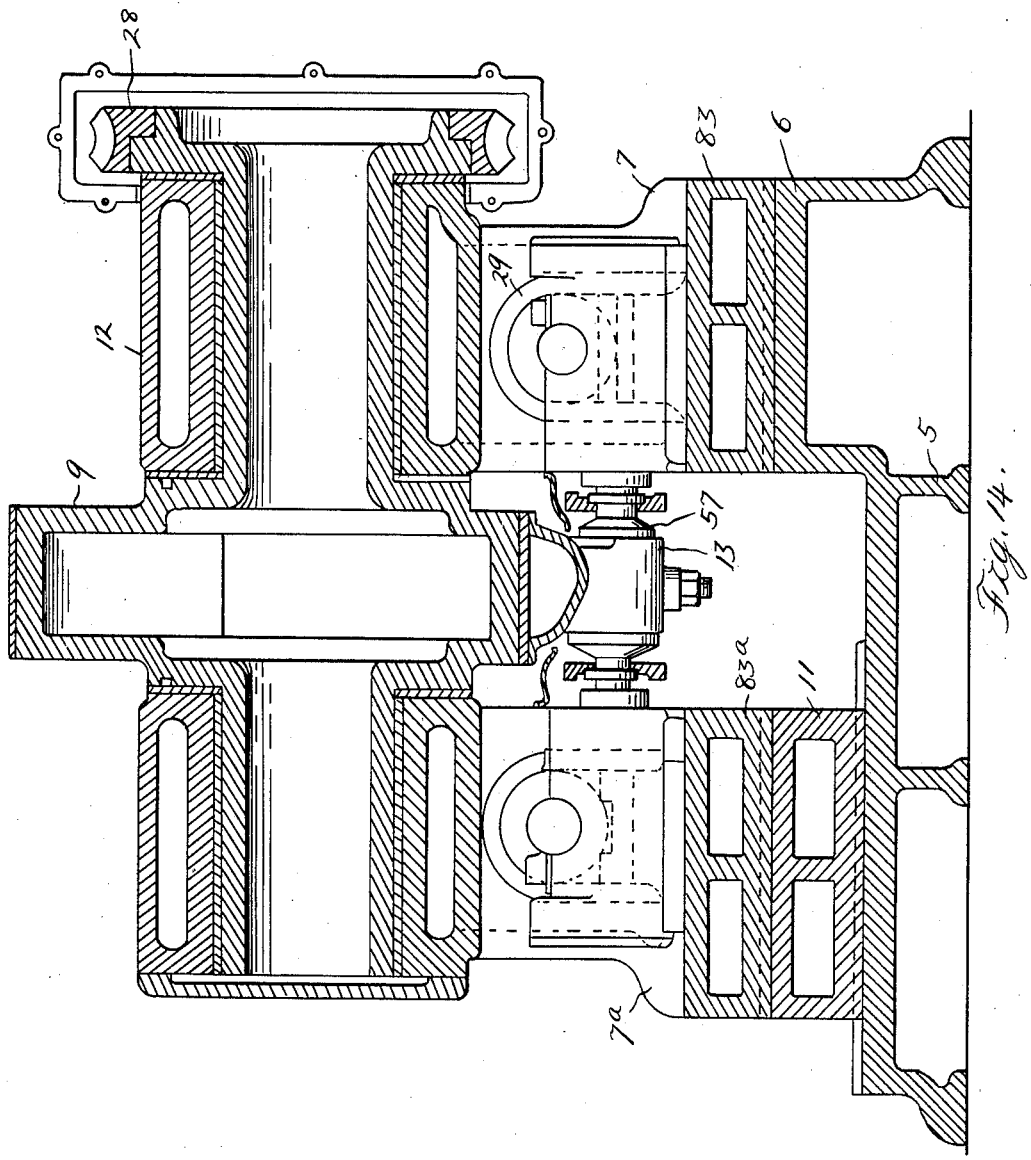

Sept. 12, 1933.   E. J. FOURNIER   1,926,332
ROTARY DRUM MILLING MACHINE
Filed Oct. 22, 1928   12 Sheets-Sheet 11
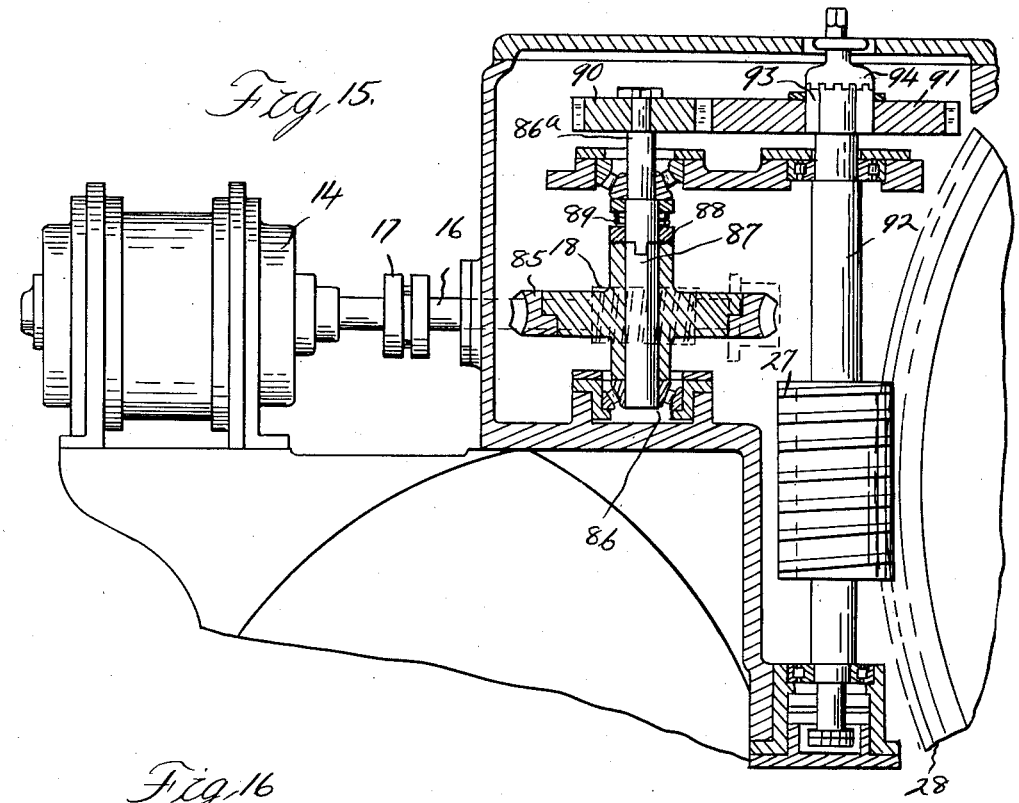
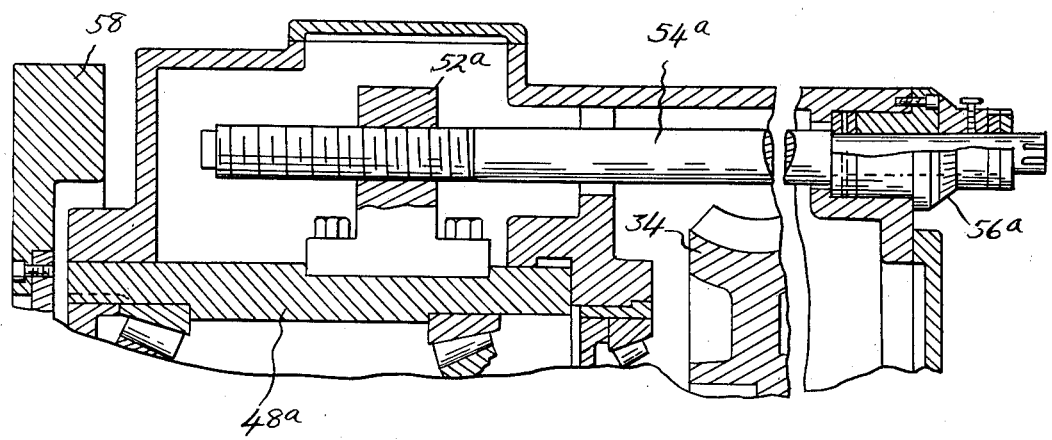
INVENTOR
Emmanuel J. Fournier
BY
Swan, Frye & Murray
ATTORNEYS Sept. 12, 1933.　　　E. J. FOURNIER　　　1,926,332
ROTARY DRUM MILLING MACHINE
Filed Oct. 22, 1928　　　12 Sheets-Sheet 12
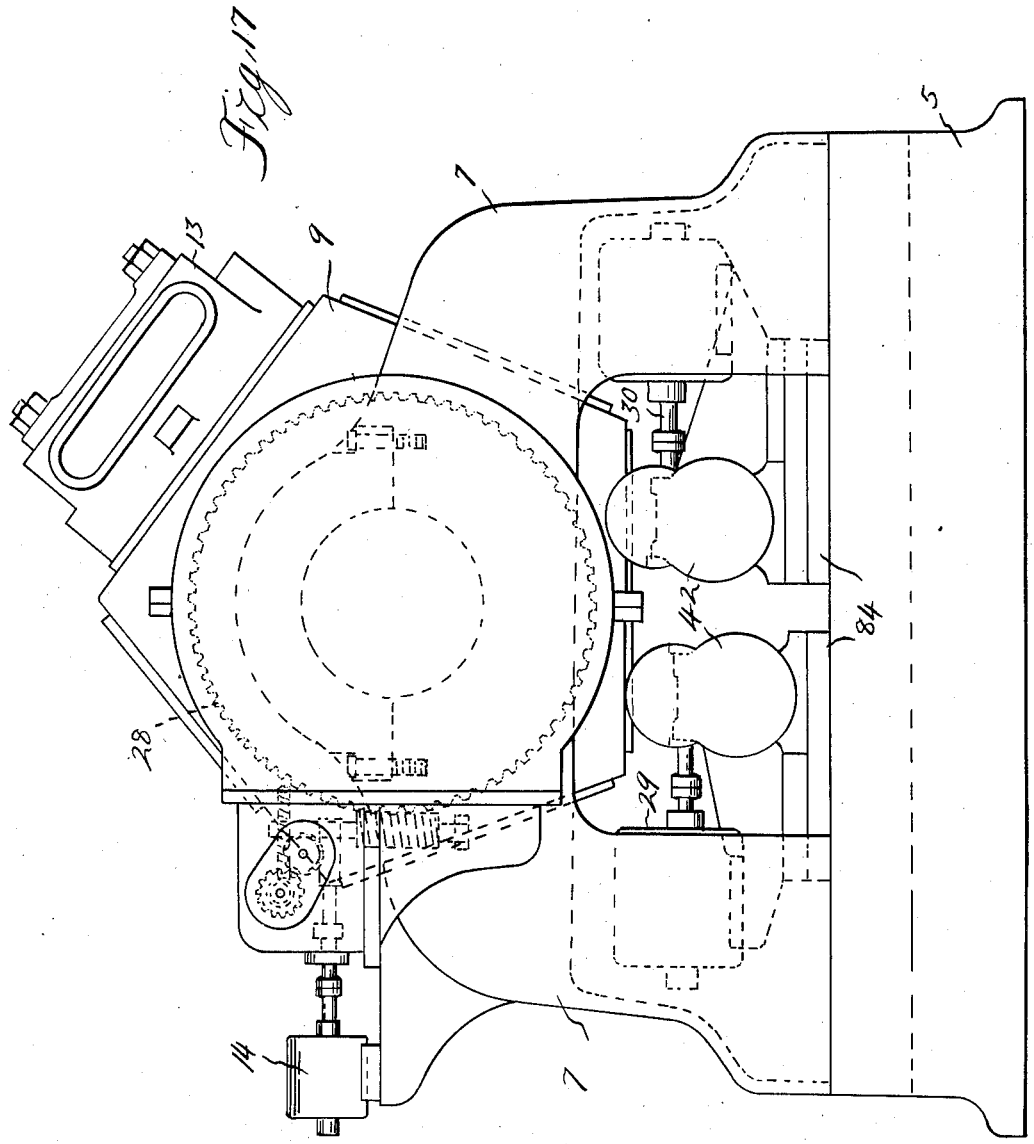
INVENTOR
Emmanuel J. Fournier
BY
Swan, Frye & Murray
ATTORNEYS Patented Sept. 12, 1933

1,926,332

UNITED STATES PATENT OFFICE 1,926,332

ROTARY DRUM MILLING MACHINE

Emmanuel J. Fournier, Detroit, Mich., assignor to Production Engineering Company, Detroit, Mich., a corporation of Michigan Application October 22, 1928. Serial No. 314,040

9 Claims. (Cl. 90—20)

This invention relates to milling machines, and more particularly to surface milling machines of the continuous production type, having a comparatively large drum or work-table adapted to carry a number of parts to be milled, and continuously rotating to successively advance such parts past a plurality of cutters.

One of the objects of this invention is the provision of a simple and sturdy milling machine affording the requisite rigidity and accuracy while giving a maximum flexibility of arrangement and adjustment of its working parts.

Another object of this invention is the arrangement in a continuous milling machine of a plurality of independently actuated cutter units, which may be combined in any desired combination of roughing and finishing cutters, separately adjustable vertically or horizontally, to suitably position them toward or away from each other, or the work-carrying drum, and driven independently or in groups, at any desired speed. Thus, for example, one or two roughing cutters and one finishing cutter may be provided at either or both sides of the work-carrying drum, according to the requirements of the parts being milled. Each cutter is mounted on separately driven spindles and can be driven at various speeds regardless of the speeds of the remaining cutters. Also the cutters may be separately moved toward or away from the drum, toward and away from each other horizontally, and up or down vertically.

A further object of this invention is the provision upon a suitable base of a pair of vertically adjustable spaced housings forming supports for the trunnions of the work-carrying drum and the various cutter units, one of the housings being also adjustable toward or away from the other to accommodate different drums of various widths and diameters carrying parts of various sizes.

Other objects and advantages will be apparent from the following description, wherein reference is made to the accompanying drawings, illustrating preferred embodiments of my invention, and wherein similar reference numerals designate similar parts throughout the several views.

In the drawings:

Figure 1 is a side elevation of a milling machine constructed in accordance with my invention.

Figure 2 is a vertical sectional view taken substantially on the line 2—2 of Figure 1.

Figure 3 is an enlarged vertical, sectional view through one of the cutter units.

Figure 4 is an enlarged detail elevation of the driving mechanism for the work-carrying drum.

Figure 5 is a plan view thereof.

Figure 6 is a detail sectional view taken substantially on the line 6—6 of Figure 3.

Figure 7 is a detail horizontal section showing the micrometer adjusting means utilized in connection with the cutter illustrated in Figures 3, 6 and 8, and taken substantially on the line 7—7 of Figure 8.

Figure 8 is a detail cross-section taken substantially on the line 8—8 of Figure 3.

Figure 9 is a vertical section taken substantially on the line 9—9 of Figure 3.

Figure 10 is a rear view of one of the cutter units illustrated in Figures 3 and 6-9, inclusive.

Figure 11 is a central vertical section through a modified form of cutter unit.

Figure 12 is a detail sectional view taken substantially on the line 12—12 of Figure 11.

Figure 14 is a view similar to Figure 2, but showing the housings supporting the work-carrying drum and cutter units adjusted vertically relative to the base.

Figure 15 is an enlarged detail section showing an alternative form of driving mechanism for the work-carrying drum, wherein manual adjustment of the drums positions may be readily effected to facilitate the preliminary set-up of the work.

Figure 16 is a detail horizontal sectional view showing a modified form of micrometer adjustment mounting for varying the position of the spindle of the cutter unit such as is shown in Figure 3, and Figure 17 is a side elevation similar to Figure 1, but wherein the individual cutter units may be separately adjusted vertically relatively to the base and standards of the machine.

Figure 13:
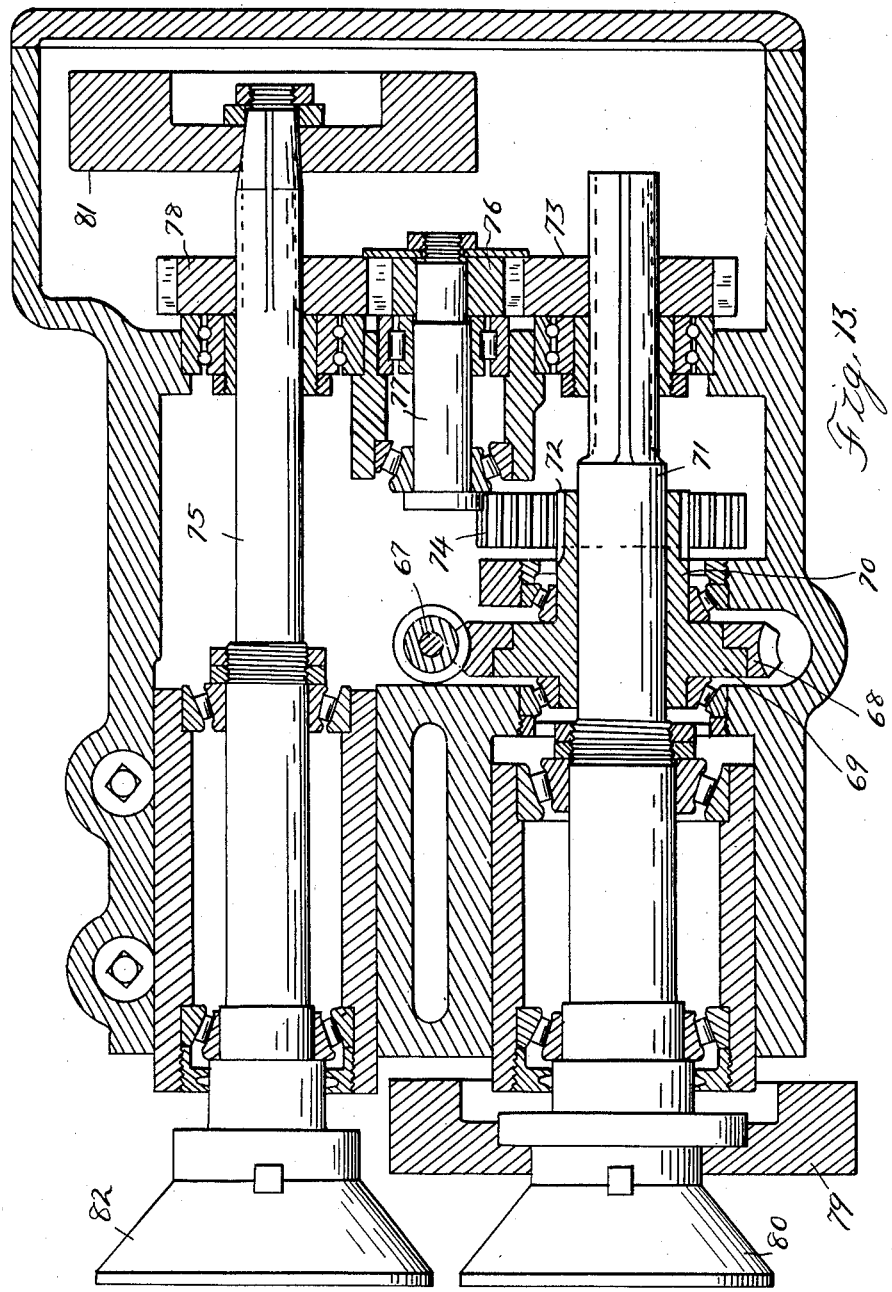
Figure 13 is a central vertical section through a further modified form of cutter unit wherein a pair of cutter spindles are mounted within a single unit.

Referring now to the drawings, the numeral 5 designates a base for my improved milling machine, and preferably formed adjacent one side with a raised platform portion 6 forming a support for one of the standards, as 7, in which the trunnions 8 of the work-carrying drum 9 is journaled. Adjacent its other side the base 5 is formed with guide-ways 10 wherein a sub-base or filler plate 11 is slidably mounted so that it can be adjusted toward and away from the raised platform 6 of the base to provide any desired clearance between the standards 7 and 7ª. The filler plate 11 is preferably of the requisite thickness to bring its upper surface into the same plane as the surface of the platform 6, and upon the filler plate 11 is suitably mounted the other standard 7a in which the trunnions 8 of the work-carrying drum are journaled.

Any suitable means may be employed for rigidly securing the standards 7 and 7a upon the base and filler plate 11 respectively, and also for rigidly securing the filler plate 11 in any adjusted position. As best shown in Figures 1 and 2, the standards 7 and 7a preferably comprise widely spaced hollow legs resting upon the base or filler plate carried by the base and joined at their upper extremities to form a saddle for the lower half of the bearing 8a in which the trunnions 8 of the work-carrying drum revolve. A removable bearing cap 12 carried by each housing fits over the upper half of the bearing 8a to completely encompass the trunnions 8. Obviously, after the removal of the bearing caps 12, the work-carrying drum may be lifted from the housings 7 and 7a and replaced with drums of different diameters or widths to accommodate various sized parts to be milled. The work-carrying drum 9 is provided with a plurality of work-carrying surfaces, and any suitable means may be utilized for securing parts to be milled, such as is shown at 13 in Figure 1, upon these surfaces. In use, the drum 9 is continuously rotated at a comparatively slow rate of speed, the work to be milled being secured upon a surface of the drum when it is spaced from the cutters, and then after the drum has carried the work past the cutters, the work is removed from the drum and a new part to be milled secured in its place.

A preferred form of driving mechanism for driving the work-carrying drum 9 is shown diagrammatically in Figures 4 and 5. A motor 14 is secured upon a suitable bracket 15 and its shaft is coupled to an elongated shaft 16 through a coupling 17. On the shaft 16 is arranged a worm gear 18 meshing with a worm pinion 19 fixed upon a horizontally disposed shaft 20 which also carries a spur pinion 21 adapted to mesh with a spur gear 22 fixed upon the parallel shaft 23 (note Figure 5). The shaft 23 carries a worm gear 24 adapted to mesh with a worm pinion 25 secured upon a vertically disposed shaft 26 carrying a worm gear 27, which in turn meshes with the comparatively large worm gear 28 fixed to one of the trunnions 8 of the work-carrying drum (note Figures 1 and 2). While the illustrated embodiment of this drive mechanism provides for a reduction of speed from motor to drum of approximately 40,000 to 1, any desired ratio of speed reduction may be secured by properly choosing the inter-meshing gears and pinions. To enable a rapid change in speed reduction, I have arranged the spur gears 21 and 22 as pick-off gears, and various combinations of spur gears may be substituted for those illustrated herein.

As above described, the rotation of the drum 9 will carry the parts to be milled between the spaced housings 7 and 7a, and suitable cutters for milling or otherwise working upon such parts may be supported upon or adjacent the housings. In the present disclosure, I have arranged a plurality of independently operated cutter units so that each of them may be separately mounted and adjusted to perform its desired function. A pair of such cutter units are illustrated in rear elevation in Figure 1 and in side elevation in Figure 2. One of them is best illustrated, however, in Figure 3, wherein is shown in section a preferred arrangement of drive mechanism for the cutter heads as well as the means for adjusting the cutter longitudinally of the units. The cutter unit comprises a motor 29 suitably mounted upon the base or one of the standards, as 7, the shaft 30 of which is connected through a suitable coupling 31 with the stub shaft 32 on which is mounted a worm gear 33 meshing with a worm pinion 34 fixed upon a circular flange 35 extending from an elongated sleeve member 36 loosely surrounding a central portion of the spindle 37 and formed adjacent one extremity with elongated spur gear teeth 36a meshing with a spur gear 38 fixed upon a short shaft 39 arranged parallel with the spindle 37 and carrying adjacent its rear extremity a spur pinion 40 meshing with a spur gear 41 splined upon the rear portion of the spindle 37.

This arrangement permits the driving of the cutter spindle 37 at any desired speed, both because of the fact that it is driven from an independent motor 29 and because the arrangement is such that the spur gears 40 and 41 may be readily changed to embody different combinations of toothed gears, upon removal of the rear closure plate 42 of the cutter housing. In other words, the spur gears 40 and 41 are arranged as pick-off gears to facilitate changes of ratio in the reduction of speed from the motor to the spindle 37. It will also be noted that the illustrated embodiment provides for the mounting of all the gears and pinions within the cutter housing on ball or roller bearings, thereby reducing friction to a minimum, while at the same time permitting longitudinal movement of the spindle 37 for purposes of adjustment of the cutter, as hereinafter described. Force feed lubrication may also be readily utilized in connection with my improved cutter drive mechanism, as for example through the actuation of a pump plunger 43 through the cam 44 fixed upon the spindle 37. The specific lubrication means is not an essential part of the present invention, and only so much of it is illustrated herein as is believed to be necessary to indicate its use.

Forwardly of the drive mechanism above described, the spindle 37 is formed with a portion 37a of larger diameter which carries a pair of inner bearing races 45 engaging circumferential series of bearings 46 which in turn engage the outer bearing races 47 secured adjacent the opposite ends of a sleeve 48 mounted within the forward portion of the cutter housing so that it may be slid longitudinally for purposes of adjustment of the spindle and cutter. As best shown in Figures 3 and 6, the sleeve 48 may be clamped in any adjusted position within the cutter housing through the medium of a pair of clamps mounted within the upper portion of the housing. Each clamp comprises a pair of slidable jaws 49 having beveled lower faces adapted to press upon the periphery of the sleeve 48 when moved toward each other through the action of the adjusting bolt 50. As herein shown, the bolt 50 is formed with a polygonal head and a shoulder 51 engaging the outer edge of one of the clamps 49, the shank of the bolt passing through one clamp and being threaded into the other clamp. Rotation of the bolt 50 in one direction will accordingly move the two clamps 49 toward each other against the tension of an intermediate spring 50a to exert a clamping action upon the sleeve 48, while rotation of the bolt in the opposite direction will serve to separate the clamping jaws 49 to free the sleeve 48, being aided in such movement of the clamping jaws by the spring 50ª. To permit the longitudinal sliding of the sleeve 48 and the spindle to effect the desired adjustment, means may be provided such as are best illustrated in Figures 7 and 8. A bracket 52 is secured to the side of the sleeve 48 and extends laterally into a longitudinal groove 53 in the cutter unit housing. The exterior portion of the bracket 52 is provided with a threaded aperture for the reception of the adjusting bolt 54, the shank of which is journaled within an aperture in the rear wall 55 of the elongated slot 53. The bolt 54 is preferably provided with a polygonal head exterior of the slot 53 and a graduated dial 56 may be secured on such exterior portion in engagement with the rear face of the wall 55. Such rear face of the wall 55 may also be marked with suitable indications to enable a micrometer adjustment of the bolt 54 to slide the bracket 52 and attached sleeve, longitudinally of the housing. During such longitudinal movement of the sleeve 48, the spindle 37 slides within the hub 36 of the worm gear 34 and within the spur gear 41, the elongated spline permitting sliding movement of the spindle relatively to the spur gear 41 without affecting the rotation of the spindle by such gear 41.

The cutter 57 is secured to the forward portion of the spindle 37 in any desired manner, and adjacent the cutter 57 is preferably mounted a fly-wheel 58 to give constant momentum to the rotating spindle and eliminate vibration. As herein shown, I mount the fly-wheel 58 upon the spindle by securing the central portion thereof to a flange 59 exterior of the housing, the forward face of the fly-wheel terminating as close to the forward end of the spindle as can be expediently done while providing room for insertion of a pin 60 or other securing means for fastening the cutter 57 upon the spindle.

By virtue of the above described mechanism, means are provided for roughly adjusting the cutter housings relatively to the work 13 upon the drum 9 by the mounting of the housings upon the base 5 or sub-base 11 of the machine. Then fine adjustment of the cutters 57 may be secured through the micrometer adjusting means, after which the clamping jaws 49 secure the cutter 57 and its attached spindle in the desired adjusted position. This arrangement facilitates the securing of the precise adjustment of the cutters needed for accurate machining, while maintaining rigidity in the mounting of both the work-carrying drum and the several cutters utilized therewith. Since each cutter is driven by a separate motor and separate reduction gearing between the motor and spindle, it is obviously possible to secure any desired speed on any cutter, with the result that different speeds may be provided for the roughing and finishing cutters, or any other desired speed arrangement may be effected.

In Figures 11 and 12 are illustrated a modified form of means for securing the desired fine adjustment of the cutters 57. In this embodiment, the entire cutter housing is adjusted longitudinally instead of the spindle only. The lower portion of the housing 61 is formed with spaced standards 62 slidably mounted within guide-ways arranged in the sub-base 63, a bracket 64 depending from the housing 61 between the standards and receiving the threaded portion of the adjusting bolt 65. The shank of the adjusting bolt 65 is journaled within the apertured rear wall 63ª of the sub-base, and exteriorly of the sub-base the bolt is formed with a polygonal head and carries a graduated dial 66 bearing against the rear face of the wall 63ª. Rotations of the adjusting bolt 65 will slide the housing 61 within the guide-ways 63 as desired.

As best shown in Figures 9, 10 and 17, the several parts of each cutter unit, including the motor and drive mechanism are so mounted upon a single base as to lend itself to ready adjustment in any direction. Thus, any cutter unit may be moved as an entirety toward or from the work 13 upon the work drum 9, or toward or from its companion cutter unit on the same side of the cutter drum, the base of the unit being then secured in the desired adjusted position upon the base platform 6 of the milling machine or a filler plate 11 (note Figure 2) vertical adjustments of the cutter units are secured either simultaneously with vertical adjustment of the standards 7 and 7ª relatively to the base of the milling machine, or may be secured by the use of independent filler plates 84 interposed between the base of the machine or a filler plate carried thereby, as 11, and the base of the cutter unit. Obviously, as many filler plates of appropriate thickness may be interposed below the base of the cutter unit as is necessary to bring the cutter of such unit to the desired height.

In Figure 13, I have illustrated another modification of my improved cutter mounting arrangement, wherein a pair of cutter spindles and attached cutters may be mounted within a single housing and simultaneously driven through mechanism housed thereby. In this embodiment, the worm gear 67 is suitably driven from a motor or other source of power, and meshes with the worm pinion 68 fixed upon a circular flange 69 extending from an elongated sleeve member 70 loosely surrounding a central portion of a spindle 71, and former adjacent its rear portion with elongated spur gear teeth 72. Suitable mechanism, such as is shown in Figure 3, may be utilized for effecting desired reductions in speed between the toothed sleeve 72 and the spur gear 73 splined upon the rear portion of the spindle 71. Such reduction gearing is not fully illustrated in Figure 13, but a pinion 74 thereof is shown in mesh with the teeth 72 of the sleeve 70, and it is to be understood that the remainder of the reduction gearing is carried in substantially the same plane with, but behind, the spindle 71. The rotation of the spur gear 73 splined upon the spindle 71 will simultaneously rotate a supplementary spindle 75 through the medium of a pinion 76 fixed upon a stub shaft 77 intermediate the spindles, and the spur gear 78 splined upon the supplementary spindle 75. The intermediate pinion 76 meshes with both of the spur gears 73 and 78, whereby the two spindles will be driven in the same direction, and at the same speeds. In Figures 13 I have also illustrated an arrangement of cutter-carrying spindles wherein the spindles are so closely placed to each other that there is not sufficient clearance to permit the positioning of fly-wheels upon the spindles in juxtaposition to the cutters. I have accordingly illustrated a modified arrangement of fly-wheel mountings, wherein one fly-wheel, as 79, is mounted in the preferred position closely adjacent the cutter 80 on one spindle, as 71, and a fly-wheel 81 mounted on the rear extremity of the supplemental spindle 75 remote from its cutter 82. This arrangement gives the benefit of the fly-wheel to each spindle while permitting relatively close positioning of the cutters carried thereby.

In Figure 14 I have illustrated a preferred means of vertically adjusting the standards for supporting the trunnions of the work-carrying drum as well as for the several cutter units. In this embodiment, a pair of filler plates 83 and 83ᵃ are secured upon the upper surface of the raised portion 6 of the base 5 and the sub-base 11, respectively. The standards 7 and 7ᵃ are then mounted upon the filler plates 83 and 83ᵃ. It will be observed that this arrangement permits the sliding of the standard 7ᵃ relatively to the other standard to change the distances between the standards to accommodate work-carrying drums of different widths and diameters, while in no way impairing the provision for mounting the drums or the several cutter units.

In Figure 5 is illustrated a modified form of drive mechanism arranged between the motor 14 and the work-carrying drum. In this embodiment, the same motor 14 may have its shaft connected to the illustrated shaft 16 through a suitable clutch 17, with the shaft 16 carrying a worm gear 18. Instead, however, of having the worm gear 18 meshing with a worm pinion fixed upon a horizontally disposed shaft, I arrange a worm pinion 85 upon a vertically disposed shaft 86 to mesh with the worm gear 18, the vertical shaft 86 being mounted in appropriate bearings 87 to permit its free rotation and absorbing thrust. The vertical shaft 86 is also arranged, preferably, so that it will enable the use of an automatic clutch between the motor 14 and the work drum to permit continuous rotation of the motor without damage to the remainder of the milling machine even should some accident result in stopping the rotation of the work-carrying drum or associated parts. To this end I have shown in Figure 15 a clutch construction comprising a lower crown clutch 87 at the upper extremity of the hub of the worm pinion 85, which is splined or otherwise suitably secured to the lower section of the shaft 86, and a companion crown clutch member 88 fixed upon the stub shaft 96ᵃ formed as a substantial continuation of the shaft 86 but divided therefrom to permit rotation of the shaft 86 without effecting rotation of the stub shaft 86ᵃ except through the clutch faces 87 and 88. A coil spring 89 presses the clutch member 88 toward the clutch member 87 and ordinarily maintains the clutch members in operative relation so that the stub shaft 86ᵃ is driven simultaneously with the shaft 86. Should it happen, however, that for some reason the work drum or associated parts become jammed, resistance to rotation of the stub shaft 86ᵃ would be immediately offered, but, since the motor 14 would be continuously driving, the lower clutch member 87 would ride upon the upper clutch member 88, ordinarily lifting the clutch member 88 against the tension of the spring 89 until the current to the motor 14 has been shut off. The automatic slippage thus effected between the clutch members 87 and 88 may serve to prevent damage to the working parts of my improved milling machine should an accident occur that results in the jamming of some working parts. Adjacent its upper extremity the stub shaft 86ᵃ carries a spur pinion 90 meshing with a spur gear 91 fixed adjacent the upper extremity of the vertical shaft 92 carrying the worm gear 27 meshing with the worm pinion 28 fixed upon the work-carrying drum. The vertical shaft 92 is also mounted in suitable bearings and is formed adjacent its upper extremity with a clutch face 93 whereby through the interposition of a suitable tool having a companion clutch face 94, the shaft 92 and its worm gear 27 may be manually rotated whenever desired. Such manual rotation of the shaft 92 is particularly useful in effecting the preliminary set-up of the work on the work-carrying drum in advance of the continued use of the milling machine. While the work-carrying drum can be rotated through partial revolutions through the medium of the motor 14 and associated driving mechanism, it is quite difficult to stop the motor just when desired to secure exact adjustments of the drums position. By directly rotating the shaft 92, however, its worm gear 27 directly moves the worm pinion 28 on the work-carrying drum and so desired adjustments of the drums' position may be quickly and accurately secured. This modification of the driving mechanism between the work-carrying drum and motor 14 has the advantages of safety, simplicity, and convenient manual adjustment.

In Figure 16 I have illustrated a modified form of micrometer adjusting means for effecting longitudinal adjustments of the spindle of a cutter unit. In this embodiment, the graduated dial 56ᵃ is mounted adjacent the rear face of the cutter housing where it can be conveniently reached by the operator should re-adjustment of a spindle be desired while the cutter unit is in position upon the milling machine. The dial 56ᵃ is secured upon an elongated adjusting shaft 54ᵃ, the threaded portion of which meshes with a threaded aperture in the radially extending bracket 52ᵃ carried by the sleeve 48ᵃ. The remaining parts of the cutter unit are substantially identical with those illustrated in Figure 3.

From the foregoing, it will be apparent that I have devised a simple compact milling machine wherein any suitable number of cutters may be advantageously employed for performing work upon parts to be milled carried by various sized drums. The speed of the cutters may be varied to suit the requirements of the work to be done thereby, and the speed of the work-carrying drum may be varied at will. Force feed lubrication is to be employed throughout the machine, though the details of the lubrication system is not shown herein in its entirety. Also, it is to be understood that suitable clutches or the like may be interposed between the motors and the parts driven thereby as required by safety regulations or for the convenience of the operator.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In a machine of the character described, a base having a raised platform at one side thereof, a fixed standard mounted upon the platform, guide-ways fixed upon the base laterally of the platform, a filler plate mounted for sliding movement within the guide-ways, a standard fixed upon the filler plate, a work-carrying drum removably mounted for rotation in said standards, means for driving the drum, and a plurality of cutter units respectively secured upon the platform and filler plate in opposed relation, whereby slidable adjustment of the filler plate will simultaneously change the distances between the standards and the opposed cutter units.

2. In a machine of the character described, a base having a raised platform at one side thereof, a fixed standard mounted upon the platform, guide-ways fixed upon the base laterally of the platform, a filler plate mounted for sliding movement within the guide-ways, a standard fixed upon the filler plate, a work-carrying drum removably mounted for rotation in said standards, means for driving the drum, a plurality of cutter units respectively secured upon the platform and filler plate in opposed relation, whereby slidable adjustment of the filler plate and standard carried thereby will simultaneously change the distances between the opposed cutter units, and a motor included in each unit for separately actuating each cutter.

3. In a machine of the character described, a base having a raised platform at one side thereof, a fixed standard mounted upon the platform, guide-ways fixed upon the base laterally of the platform, a filler plate mounted for sliding movement within the guide-ways, a standard fixed upon the filler plate, a work-carrying drum removably mounted for rotation in said standards, means for driving the drum, a plurality of cutter unit assemblies respectively secured upon the platform and filler plate in opposed relation, whereby slidable adjustment of the filler plate will simultaneously change the distances between the standards and the opposed cutter units, and means for adjusting the position of each cutter unit assembly relatively to the platform or filler plate upon which it is secured.

4. In a machine of the character described, a base having a raised platform at one side thereof, a fixed standard mounted upon the platform, guide-ways fixed upon the base laterally of the platform, a filler plate mounted for sliding movement within the guide ways, a standard fixed upon the filler plate, a work-carrying drum removably mounted for rotation in said standards, means for driving the drum, a plurality of independently driven cutter units respectively secured upon the platform and filler plate in opposed relation, whereby slidable adjustment of the filler plate will simultaneously change the distances between the drum-supporting standards and the opposed cutter units, and means for independently positioning each cutter unit relatively to the remaining units.

5. In a machine of the character described, a base having a raised platform at one side thereof, a fixed standard mounted upon the platform, guide-ways fixed upon the base laterally of the platform, a filler plate mounted for sliding movement within the guide ways, a standard fixed upon the filler plate, a work-carrying drum removably mounted for rotation in said standards, means for driving the drum, a plurality of independently driven cutter unit assemblies respectively secured upon the platform and filler plate in opposed relation, whereby slidable adjustment of the filler plate will simultaneously change the distances between the standards and the opposed cutter units, and means for separately adjusting each cutter unit assembly relatively to the remaining units, including micrometer adjusting means carried by the cutter unit assemblies.

6. In a machine of the character described, a base, a pair of standards mounted thereon, one of said standards being fixed and the other slidable, and each having a pair of opposed separated legs, a rotatable work-carrying drum journaled in the standards and having its axis substantially parallel to the line of mobility of the slidable standard, means for driving the drum, and a plurality of cutter unit assemblies one of which is mounted upon the base between the legs of the fixed standard, and another of which is positioned partially beneath the slidable standard and movable either together therewith or independently thereof.

7. In a machine of the character described, a base, a fixed standard mounted thereon, a slidable support also mounted thereon, another and complementary standard carried by the slidable support, a work-carrying drum journaled in the standards, means for driving the drum, a cutter assembly mounted upon the base laterally of the work-drum, and another cutter assembly carried by the slidable support and movable both independently thereof and together therewith.

8. In a machine of the character described, a base, a pair of supporting standards mounted thereon, each having spaced legs, a work-carrying drum journaled in the standards, means appurtenant one standard for driving the drum, means for moving the other standard toward and away from the first, a plurality of cutters separately mounted upon the base adjacent the drum and between the spaced legs of the standards, independent motors for driving each cutter, and independent means for adjusting the position of each cutter.

9. In a machine of the character described, a base, a pair of supporting standards mounted thereon, each having spaced legs, a work-carrying drum journaled in the standards, means for moving one standard toward and away from the other, means for driving the drum, means for moving one of the standards horizontally, means for moving each standard vertically, and a plurality of self-contained cutter units mounted upon the base in various positions laterally of the drum and independently adjustable, one of said cutter units being also movable as a unit with the movable standard, whereby rough adjustment of the relative positioning of the units may be secured by adjusting the positioning of the movable standard upon the base and of the individual units with respect thereto, and means for securing fine adjustment of each cutter unit by moving parts only of the unit relatively to the remainder thereof.

EMMANUEL J. FOURNIER.